United States Patent [19]

Melcher et al.

[11] 4,041,536
[45] Aug. 9, 1977

[54] OPTICAL SCANNER

[75] Inventors: Robert Lee Melcher, Yorktown Heights; Norman Steven Shiren, Ossining, both of N.Y.

[73] Assignee: International Business Machines Corporation, Armonk, N.Y.

[21] Appl. No.: 643,971

[22] Filed: Dec. 24, 1975

[51] Int. Cl.² ............................................. H04N 5/30
[52] U.S. Cl. .................................. 358/213; 250/211 R; 315/169 TV
[58] Field of Search .................... 178/7.1; 250/211 J, 250/211 R, 578; 315/169 R, 169 TV; 340/173 LS

[56] References Cited

U.S. PATENT DOCUMENTS 3,935,564  1/1976  Quate et al. .................. 178/7.1 UX

Primary Examiner—Robert L. Richardson
Attorney, Agent, or Firm—Bernard N. Wiener

[57] ABSTRACT

This disclosure provides an optical scanner for transforming an optical image into electrical signals.

Through practice of this disclosure an optical image is projected onto a surface of a photosensitive semiconductor body wherein there is established a charge distribution or perturbation or pattern which reflects the variations in optical intensity of the optical image. Through the parametric interaction of simultaneously applied electric field and acoustic wave to each respective portion of the electrical charge pattern on the photosensitive semiconductor surface, there is obtained a backward acoustic wave which is directed toward the source of the initiating acoustic wave. In particular, the acoustic wave in the acoustic medium may be either a surface acoustic wave (SAW) or a bulk acoustic wave. Where the surface acoustic wave is utilized, the acoustic medium may be commensurately thin. The acoustic medium must be piezoelectric for it is the interaction of the electric field of the acoustic wave with the applied electric field via the charge pattern which achieves the parametric interaction. Through the "holographic" electric field echo effect, an optical scanner may be achieved for the practice of this disclosure by storage of a charge pattern related to the optical image.

12 Claims, 9 Drawing Figures

OPTICAL SCANNER

BACKGROUND OF THE INVENTION

The following identified two U.S. Pats. and one U. S. Pat. application are of background interest for the practice of this invention;

1. U.S. Pat. No. 3,826,865, by Quate et al., issued July 30, 1974 for "Method and System for Acousto-Electric Scanning" described in the Abstract thereof the scanning of conductivity perturbations in semiconductor films by using the piezoelectric fields of acoustic surface waves. A piezoelectric substrate is situated adjacent to and spaced a small distance from a semiconductor film. A reading acoustic surface wave of relatively long pulse duration is propagated along the piezoelectric substrate in one direction and a relatively short scanning acoustic wave pulse is propagated in the opposite direction. The amplitude of the reading wave is modulated by the scanning pulse at the point where the two pass each other. An optical pattern image on the semiconductor film produces conductivity perturbations through carrier-pair generation. These conductivity perturbations appear as amplitude variations in the reading acoustic wave pulse after its interaction with the scanning acoustic wave pulse, so that the electrical output from the piezoelectric substrate contains the optical information in the pattern image on the semiconductor film. Two dimensional scanning may be accomplished by successively mechanically displacing the optical pattern being scanned with respect to the semiconductor film.

2. U.S. Pat. No. 3,826,866 by Quate et al, filed Apr. 16, 1972, and issued July 30, 1974 for "Method and System for Acousto-Electric Scanning" describes in the Abstract thereof the scanning of an energetic image to convert the information therein into an electrical signal. An electrical field is applied thereto to increase the average depletion layer width by charging the semiconductor surface states. The energetic image is impinged upon the semiconductor and begins discharging the surface states in accordance with intensity variations in the image to produce depletion layer with variations. A piezoelectric substrate is situated adjacent to the semiconductor, and a reading acoustic surface wave is propagated therein along one dimension of the semiconductor. The amplitude of the reading wave is modulated by the width perturbations of the depletion layer of the semiconductor. The output acoustic wave (i.e., the modulated reading wave) is converted to an electrical signal having amplitude variations corresponding to the depletion layer width perturbations. Two dimensional scanning of the semiconductor is achieved through propagating a plurality of reading acoustic surface waves differing in frequency from each other and spaced from each other along a second dimensions of the semiconductor film.

3. Copending U.S. Pat. application Ser. No. 490,527, filed July 22, 1974, and commonly assigned, and now U.S. Pat. No. 3,919,700 issued Nov. 11, 1975 discloses a "Memory System" wherein piezoelectric photosensitive semiconductor crystal or semi-insulators are employed either to store or to process high frequency signals. Storage is accomplished in the crystal by a stable pattern of trapped electrons produced by the interference between two radiofrequency input signal pulses. The latter are applied successively to the crystal, after an initial illumination, whereby charge is trapped in shallow donor sites. The ultrasonic wave of the first pulse together with the electric field of the second cause the trapped electrons to be redistributed in a pattern which has the same spatial variation as the ultrasonic wave. In effect, the information contained in the original pulse is stored in the crystal, the latter serving as a recording medium operating over the whole radiofrequency and microwave ranges. The underlying mechanism by which charge, trapped in shallow donor sites, may be redistributed into a pattern which contains the spatial variation of an acoustic wave, is by field induced ionization from the donors into the conduction band.

The referenced copending patent application Ser. No. 490,527 presents especially relevant background information for the practice of this invention. Therefore, for purpose of disclosure herein for practice of this invention, additional substantive information presented in said application will now be paraphrased. A CdS crystal is prepared or grown so that it has high resistivity ($\geqq$ 100,000 ohm-cm) and may be doped with shallow impurities and annealed in sulfur vapor as in described in a paper entitled "Ultrasonic Amplification in Sulfur Doped CdS" by D. L. White that appeared in the Dec. 1965 issue of the Proceedings of the I.E.E.E., pp. 2157-2158.

The photosensitive semiconductor CdS has the characteristics both of low electrical conductivity and of shallow electron trapping states. These characteristics make it desirable for use as a memory when light is applied to such a crystal which excites electrons therein. Some of the excited electrons are trapped on impurities in the CdS crystal. After such light excitation, a radiofrequency pulse having frequencies in the approximate range of $10^2$ megacycles to $10^5$ megacycles is applied to the crystal so that the latter converts such pulse to an acoustic wave with the same frequency as the input radiofrequency pulse. Such acoustic wave oscillates within the CdS crystal and does not affect the separation of charges produced by the exciting light. During the lifetime of the acoustic pulse, a second radiofrequency pulse is applied to the crystal. The electric field of the ultrasonic (i.e., acoustic) wave of the first pulse interacts with the electric field of the second pulse to cause the trapped electrons to redistribute into a pattern which has the same spatial variation as the ultrasonic wave. Accordingly, information, which is contained in one or both of the applied pulses, is stored in the trapped electron pattern. The stored information in the CdS crystal can be retrieved by applying thereto a third radiofrequency pulse which causes the stored electron distribution to radiate an acoustic wave in the backward direction relative to the input acoustic wave in the crystal which carried the previously stored information. The backward wave which carries the previously stored information is detected via the the piezoelectric effect at the crystal surface. The stored information can also be read out by applying a forward acoustic wave which excites the stored charge pattern to produce a microwave current which can be read out with the circuit used to apply the second microwave pulse.

In the formation of a cosine charge grating in the CdS crystal, the first pulse generates an $(\omega,\vec{k})$ elastic wave (i.e. phonons) via a piezoelectric effect. During the second pulse, the total electric field in the crystal is the sum of the piezoelectric field of the elastic wave generated by the first pulse and the applied electric field of the second pulse. The probability for field-induced tunneling from trapping states is a function of the magnitude of this total electric field. Therefore, it contains a term which is time independent but varies spatially as cos $(\vec{k}\cdot\vec{r})$. Because of this tunneling probability there is an inhomogeneous trapped electronic space-charge grating which also varies as cos $(\vec{k}\cdot\vec{r})$. The electric field of the third (reading) pulse acts on the space-charge grating to generate a backward, (as well as a forward) propagating wave which is detected at the surface of the crystal. In addition, the space-charge grating generates a uniform electric field when it is acted upon by a foward-propagating elastic wave which is piezoelectrically generated at the crystal surface by the third (reading) pulse. The output signal is the sum of these two outputs which occur simultaneously if a single microwave cavity is used to apply both the first and second pulses. In a two cavity configuration, the outputs can be separated.

OBJECTS OF THE INVENTION

It is an object of this invention to provide a simple, fast and high resolution technique for converting an optical image into radiofrequency information in a format suitable for data transmission on a communication channel.

It is another object of this invention to utilize the redistribution of trapped space charge in a piezoelectric crystal resulting from the non-linear interaction of a strain wave with a radiofrequency electric field for converting an optical image into usable radiofrequency information.

It is another object of this invention to achieve the foregoing object by utilizing a surface acoustic wave (SAW) on a piezoelectric substrate which is over-laid with a photosensitive semiconductor (PSSC).

It is another object of this invention to achieve the immediately preceding object:

1. by focusing the optical image on the PSSC to trap excited charge carriers at impurity states in the PSSC in a spatial distribution corresponding to the intensity distribution of the incident light image; and 2. by applying a short electric field pulse across the PSSC and propagating a surface acoustic wave (SAW) along the piezoelectric substrate simultaneously with the focusing of the image on the PSSC, the space charge in the PSSC is redistributed into a cosine grating because of the non-linear interaction between the applied electric field pulse and the piezoelectric field of the SAW wave.

It is another object of this invention to use the inherent delay line features of a SAW device for reading out sequentially all the optical data imaged on a planar device.

It is another object of this invention to provide an optical scanner by which the optical resolution of an image is determined by the bandwidth and the SAW velocity.

It is another object of this invention to provide an optical scanning device with analog readout wherein the amplitude modulation of the parametrically generated backward acoustic wave is proportional to the optical intensity at any given point of the optical image.

It is another object of the present invention to provide an optical scanner of the latter type which is capable of operation at room temperature.

SUMMARY OF THE INVENTION

Briefly, this invention provides a thin optical scanner using phonon echoes. A piezoelectric crystal has a photoconductor overlay. A surface acoustic wave SAW) transducer propagates a broad strain wave pulse on the surface of the crystal. A relatively shorter high frequency electric field pulse is coupled to the piezoelectric crystal through the photoconductor which has an optical signal focused thereon. The parametric interaction of electric field and strain wave produce a backward travelling SAW which is modulated by the optical signal focused on the photoconductor. The backward travelling SAW is converted to an electric signal by the SAW transducer which signal is modulated in accordance with the information of the optical signal. The magnitude of the backward wave is determined by the number density of filled impurity states (traps) in the crystal. The local number density is in turn determined by the light intensity at a given point in the crystal. Therefore, the backward wave of a device in accordance with the principles of this invention is amplitude modulated by the light intensity.

More particularly this invention provides an optical scanner for transforming an optical image into electrical information. Through practice of this invention an optical image is projected onto a surface of a photosensitive semiconductor body wherein there is established a charge distribution which reflects the variations in optical intensity of the optical image. Through the parametric interaction of a simultaneously applied high frequency electric field and an acoustic wave in piezoelectric material to each respective portion of the electrical charge pattern on the photosensitive semiconductor surface, there is obtained a backward acoustic wave which is directed toward the source of the initiating acoustic wave. In particular, the acoustic wave in the acoustic medium may be either an acoustic surface wave (SAW) or a bulk acoustic wave. Where the surface acoustic wave is utilized, the acoustic medium may be commensurately thin. The acoustic medium must be piezoelectric for it is the interaction of the piezoelectric field of the acoustic wave with the high frequency applied electric field via the charge pattern which achieves the parametric interaction.

For the practice of this invention there are utilized the following identified two physical phenomena: photosensitive semiconductor, wherein a charge distribution occurs as consequence of light on a surface thereof; and a medium which will sustain propagation of an acoustic wave with an associated electric field component. Because the applied electric field interacts with the electric field of the acoustic wave in different amounts in the presence of and in the absence of charge, and dependent upon the amount of charge per unit volume in the interaction zone, it is possible for the practice of this invention to utilize separated or integrated materials to achieve the parametric interaction by which a backward coustic wave is achieved in the piezoelectric material.

To the extent that the photosensitive semiconductor had defect states which can be charged and separation of charge be achieved to that extent does the presence of the optical image in the photosensitive semiconductor permit long-time storage of a charge pattern replica of the optical image. As disclosed by precursor application Ser. No. 490,527, referred to hereinbefore, information can be stored in a charge grating formed in defect states through the interaction of a piezoactive acoustic wave with a microwave (or radiofrequency) electric field in a piezoelectric semiconductor. Accordingly, the optical information in the form defined on the surface of the photosensitive semiconductor can be retrieved through modulation in amplitude of either or both of the acoustic output wave and the output electric field.

PRACTICE OF THE INVENTION

The practice of the present invention is distinguished from the disclosure of said U.S. Pat. Nos. 3,826,865 and 3,826,866 as follows:

a. In said U.S. Pat. Nos. 3,826,865 and 3,826,866 a transverse DC electric field modulates the properties of the photosensitive semiconductor which in turn affects the degree to which the reading acoustic surface wave is attenuated by the charge pattern from the optical image. The transverse high frequency electric field of this invention interacts parametrically with the reading acoustic wave where the charge pattern has been achieved by the optical image.

b. In the disclosure of said reference U.S. Patents by Quate et al, the applied DC electric field prevents modulation of the reading acoustic wave. In contrast, in the practice of this invention, a backward propagating elastic wave is generated whose amplitude is modulated by the light intensity pattern. This backward wave is generated via the parametric coupling between the forward acoustic wave and the applied radiofrequency field. The magnitude of the parametric coupling is proportional to the light intensity pattern.

c. Whereas in said patents by Quate et al, the reading acoustic wave is exposed to the optical pattern only when the DC voltage is turned off, in the practice of the present invention, the absence of the radiofrequency signal precludes any parametric interaction and consequently the development of a backward acoustic wave with the information content of the optical image charge pattern impressed thereon.

The inventive apparatus can be employed as an optical scanning device by illuminating a narrow area, or "line" of an object containing optical information, such as a printed page. As the object moves past the scanner a driving source produces properly timed high frequency electrical energy to energize the SAW transducer, and, the electrode system produces the necessary high frequency electric field, which is synchronized with the SAW driving source. When the backward travelling wave reaches the SAW transducer an amplitude modulated radiofrequency signal is produced by the SAW transducer. Accordingly, the optical information contained by the object presented to the surface of the photosensitive semiconductor body can be broken down into number of "lines" of arbitrary width, and each line sequentially scanned and converted to a radiofrequency electrical signal for read out.

The optical scanning device of this invention is based on the parametric interaction of a forward propagating acoustic wave in a piezoelectric crystal with an applied radiofrequency electric field. A photosensitive semiconductor is proximate to or is itself a piezoelectric crystal. An elastic wave is propagated in the piezoelectric crystal. A pair of electrodes are supplied to provide a high frequency electric field through the photosensitive semiconductor and the piezoelectric crystal. An optical signal is focused on the photosensitive semiconductor. The high frequency electric field is energized when an acoustic wave reaches the location of the photosensitive semiconductor. The interaction of the strain field of acoustic wave and the high frequency electric field parametrically generates a backward acoustic wave whose amplitude is determined by the number density of filled impurities states or traps in the the photosensitive semiconductor. The local number density is in turn determined by the light intensity at a given point.

The backward travelling acoustic wave, which is the result of the parametric interaction, is a function of the number density of filed impurities states or traps, the amplitude of the forward propagating elastic wave and the amplitude of the radiofrequency electric field. Accordingly, practice of this invention relies upon the modulating of the local number density of filled impurity states to produce a backward travelling acoustic wave which is modulated with desired information. An acoustic surface wave transducer is located on the piezoelectric crystal. Said photoconductor is itself piezoelectric or is deposited on or adjacent to one of the major surfaces of the piezoelectric crystal having an active area. The SAW transducer is outside of the active area. Electrode means is provided to couple a high frequency electric field through both the piezoelectrical crystal and the photoconductor in the active area. A focusing system focuses an optical image on the active area of the photoconductor. A relatively long acoustic wave (SAW) pulse is propagated by the transducer in the piezoelectric crystal, the length of the pulse being at least equivalent to the extent of the active area of the photoconductor. When the SAW pulse registers with the active area of the photoconductor, upon which the focusing system images the desired optical signal, the electrode system is energized to couple a high frequency electric field through both the photoconductor and the piezoelectric crystal. The parametric interaction of the propagating strain wave on the piezoelectric crystal with the high frequency electric field produces a backward travelling SAW wave. The backward travelling SAW wave is amplitude modulated in accordance with the spatial distribution of the optical signal imaged on the photoconductor. The same SAW transducer which propagated the forward travelling SAW pulse can also be employed to transduce the backward travelling SAW wave into an amplitude modulated radiofrequency signal whose amplitude modulation corresponds to the spatial distribution of the optical signal imaged on the photoconductor.

In greater detail, an apparatus may be constructed, in accordance with the principles of this invention, whereby optical information can be stored for later read-out, by employing a piezoelectric substrate upon which a photosensitive semiconductor is deposited, the combination of which structure is included between a pair of electrodes. An optical image is focused on the photosensitive semiconductor and an acoustic wave is propagated in the piezoelectric substrate. The piezoelectric substrate has storage properties in accordance with the disclosure of said copending application Ser. No. 490,527. When the acoustic wave reaches the location of the photosensitive semiconductor, a high frequency electric field is applied thereto exciting charge carriers which are trapped at impurity states in the photosensitive semiconductor in a spatial distribution related to the light intensity distribution. The electric field applied to the photosensitive semiconductor redistributes the space charge into a cosine grating which exists only in the areas of the photosensitive semiconductor which were illuminated. At a later time, a second electric field pulse is applied to excite the grating generating forward and backward surface acoustic waves, either or both of which can be converted by transducers into radiofrequency signals which are amplitude modulated with optical information.

BRIEF DESCRIPTION OF THE DRAWINGS

FIGS. 3A and 3B are time domain diagrams of a sequence of events exemplifying the operation of the embodiments of the invention presented by FIGS. 1A and 1B for storage of optical information wherein the relative occurrence in time of the applied acoustic wave and the high frequency electrical pulse applied to the photosensitive semiconductor are identified relative to the amplitude variations of the output electrical signal, in which FIG. 3A is for read-out at the transducer on the left and FIG. 3B is for read-out at the transducer on the right.

DESCRIPTION OF THE EMBODIMENTS OF THE INVENTION

Figure 1A:
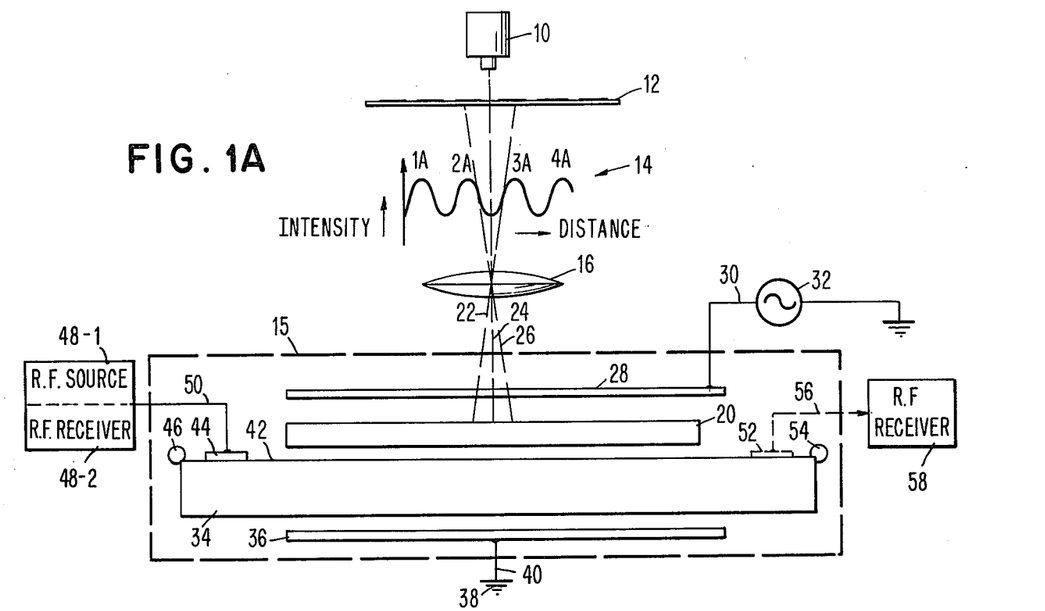
FIG. 1A is a schematic diagram of optical scanner apparatus in accordance with the invention for converting an optical pattern projected on a photosensitive semiconductor surface into an electric signal via an acoustic wave in a piezoelectric substrate which is distinct from the photosensitive semiconductor, in which the preferred embodiment of the invention has read-out at a transducer at the left and another embodiment has read-out at a transducer at the right.
Figure 1B:
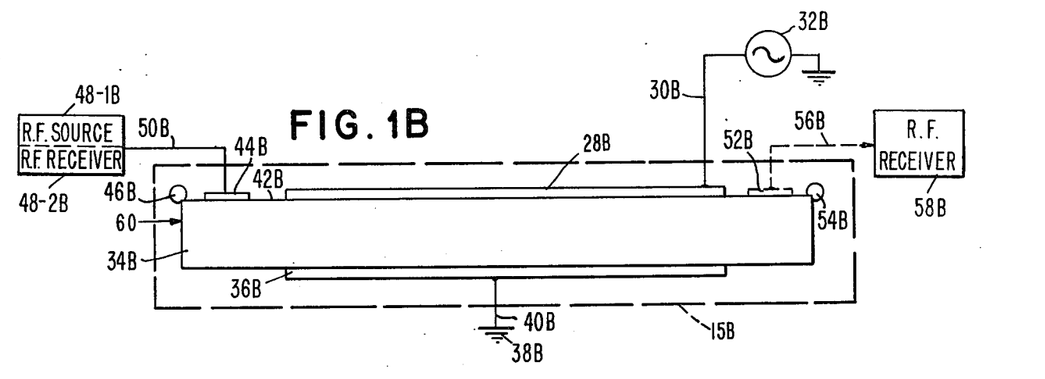
FIG. 1B is a schematic diagram of a device structure illustrating an embodiment of the invention in which the photosensitive semiconductor and the piezoelectric substrate are an integrated body, in which the photosensitive semiconductor may be adjacent to or be an identical part of the piezoelectric substrate.

FIGS. 1A and 1B present preferred embodiments of the invention which are drawn with solid lines and also have portions which may be added thereto for alternative embodiments which are drawn in broken lines.

The schematic diagram of FIG. 1A presents in solid lines a preferred embodiment of this invention of an optical scanner whereby intensity variations in optical pattern in the spatial domain are transformed to amplitude variations of an electrical signal in the time domain. The operation of the preferred embodiment utilizes a transducer 44 shown in solid lines at the left portion of piezoelectric substrate 34 for both incoming radiofrequency waves and outgoing acoustic waves.

A light source 10 illuminates an object 12 to provide an optical intensity pattern 14 having the exemplary optical intensity peaks 1A, 2A, 3A and 4A in distance across the object 12, which are presented in diagrammatric form between the object 12 and lens 16. Focusing lens 16 projects the optical intensity pattern 14 onto the surface of photosensitive semiconductor 20 in the device structure 15 of FIG. 1A via rays 22, 24, and 26 which traverse transparent electrode 28. Said electrode 28 is connected via conductor 30 to radiofrequency voltage source 32.

Device structure 15 of the preferred embodiment of FIG. 1A further comprises piezoelectric material substrate 34 and ground electrode 36 shown connected to ground 38 by conductor 40. For purposes of illustration, but an acceptable operational configuration, the transparent electrode 28, photosensitive semiconductor 20, piezoelectric substrate 34, and ground electrode 36, are shown as relatively spaced from the adjacent one thereof. Appropriate dielectric material may be included in the spaces between adjacent said members provided only that it have the appropriate electrical characteristics and the optical transparency characteristics so that the optical and electrical operation for device structure 15 can be obtained in accordance with the principles of this invention.

To complete the device structure 15, there is a surface acoustic wave transducer 44 on the piezoelectric substrate 34 at the left and closer to the end there is an acoustic wave absorber 46. The function of the transducer 44 is to accept from conductor 50 a radiofrequency electrical signal from radiofrequency voltage source 48-1 which is to be transformed by the piezoelectric character of substrate 34 into an acoustic wave therein and also to receive the backward wave. Said backward wave is presented in radiofrequency voltage form to radiofrequency voltage receiver 48-2.

As an alternative embodiment using generally the illustration of FIG. 1A, another transducer 52 and absorber 54 are at the right portion of piezoelectric substrate 34 whereby an acoustic wave may be received from substrate 34 by transducer 52 with respective electrical signals on conductor 56 in signal communication with radiofrequency receiver 58. Acoustic wave absorbers 46 and 54 are established at the respective ends of substrate 34 so that there are no undesirable reflections of acoustic waves therefrom into the piezoelectric substrate 34.

The transducer 44 may receive acoustic wave information from piezoelectric substrate 34 under two different operational circumstances. In one operational circumstance for FIG. 1A, through a parametric interaction of an acoustic wave established by transducer 44 in piezoelectric substrate 34 and a radiofrequency electric-field there-across there is obtained read-out of the optical intensity pattern 14 from transducer 44. The information is presented to radiofrequency receiver 48B via connection 50B. In another operational circumstance by transducer 44 of FIG. 1A, the optical information is stored in piezoelectric substrate 34 and a radiofrequency electric field applied thereacross obtains readout via a backward wave. The information is presented to radiofrequency receiver 48B via connection 50. Alternatively, the stored optical information in piezoelectric substrate 34 may be read-out from a forward acoustic wave via transducer 52. The information is presented to radiofrequency receiver 58.

Whereas the embodiments of this invention exemplified by FIG. 1A incorporate separate materials for the photosensitive semiconductor 20 and the piezoelectric substrate 34, the embodiment thereof shown by FIG. 1B is an integrated body 60 in which the surface 42B and the body 34B provide the respective roles of photosensitive semiconductor surface and piezoelectric substrate.

In all other respects, the device structure 15B of FIG. 1B is identical with the comparable aspects of the device structure 15 of FIG. 1A. The acoustic wave launched in piezoelectric substrate 34B at transducer 44B has an associated electric field which interacts with the electric field of the applied radiofrequency voltage via a charge distribution in photosensitive semiconductor 42B to obtain a backward acoustic wave with information modulation thereon corresponding to the optical image of the optical intensity variation 14B from object 12B. Accordingly, by selectively integrating or separating the photosensitive semiconductor 20 with or from the piezoelectric substrate 34, there can be achieved for the practice of this invention several adjustments in the optical scanner device operation. Further, the capability for the practice of this invention of having either an integrated or separated photosensitive semiconductor and piezoelectric substrate permits the operation to be performed either with a surface acoustic wave (SAW) or a bulk acoustic wave dependent upon the characteristics of the materials utilized.

Figure 1C:
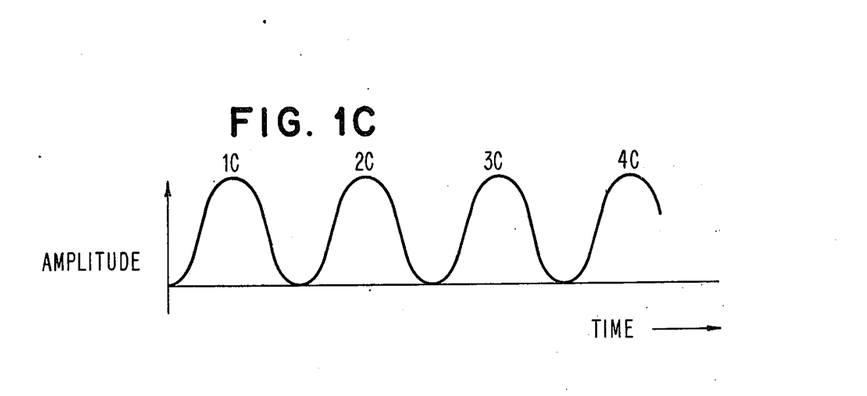
FIG. 1C is a signal diagram illustrating the correspondence between the variations in optical intensity of the optical pattern projected on the surface of the photosensitive semiconductor shown in FIG. 1A with the variations in electrical amplitude of the output electrical signal wherein the horizontal axis of the optical intensity pattern of FIG. 1A is distance and the horizontal axis of the electrical signal of FIG. 1C is time, in which the signal diagram is illustrative for both read-out by parametric interaction and for storage read-out by the transducer at the left.

FIG. 1C presents a characterization of the exemplary output electrical signal in the time domain from transducer 44 with peaks 1C, 2C, 3C and 4C corresponding to the optical intensity pattern in the spatial domain of FIG. 1A with respective peaks 1A, 2A, 3A, as projected on the photosensitive semiconductor 20.

Figure 2:
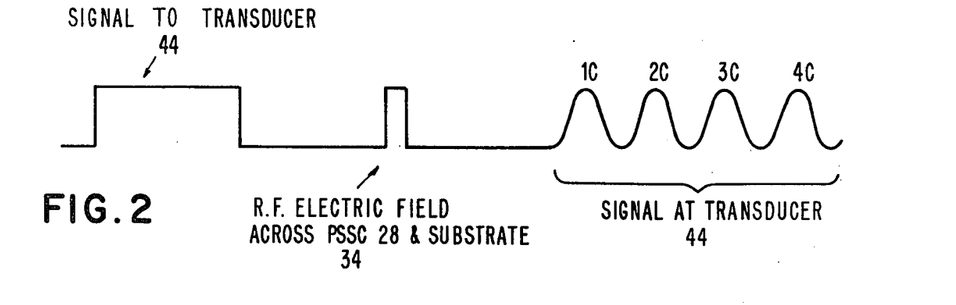
FIG. 2 is a time domain diagram illustrating the sequence of events for obtaining electrical signal information related to the information content of an optical pattern as shown in FIG. 1A through use of parametric interaction effect, with read-out at the transducer at the left.

FIG. 2 is a time domain diagram illustrating the relative periods during which occur applied signals and output signals. In this sequence, the optical image is applied to the PSSC 20 during or shortly before the arrival of the input acoustic wave from the transducer 44 and the application of the radiofrequency parametric pump field across the PSSC 20 and piezoelectric substrate 34. The parametric interaction between the acoustic wave and the pump field produces a backward acoustic wave only in those regions in which there is a high light intensity. The backward wave bears the information of the optical pattern. The parametric physical mechanism requires only one radiofrequency field to be applied across the PSSC 20 and piezoelectric substrate 34. The "holographic" physical mechanism involving storage requires two radiofrequency pulses across PSSC 20; PSSC; one to "store" the information and the other to "read" it. On read-out of the "stored" information, both a forward and backward acoustic wave are generated. Both of these waves are modulated with the stored information and both of them can be received by the appropriate transducers 44 and 52 respectively. In the parametric process described the backward wave is generated instantaneously and does not result from storage of information.

Figure 3A:
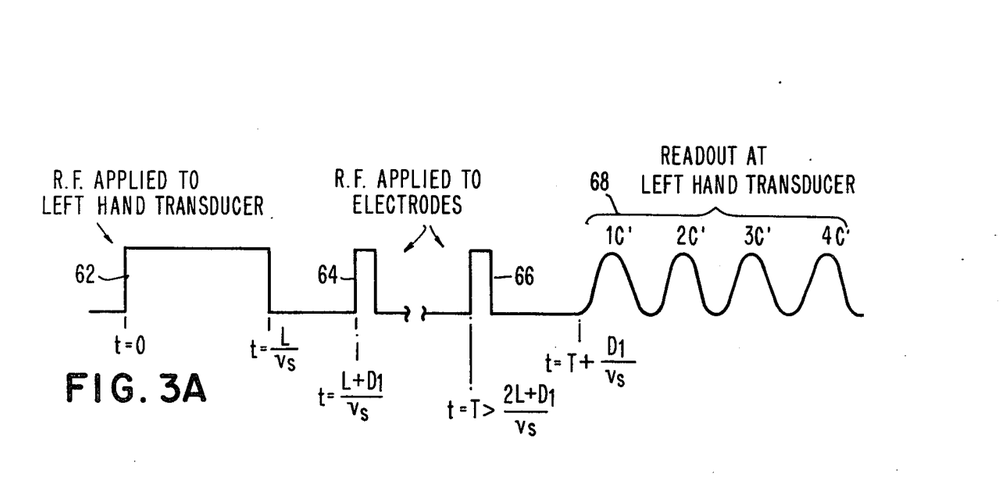

FIG. 3A is the time domain diagram characteristic of a particular operation of the embodiments of FIGS. 1A and 1B for obtaining an electrical information signal from the device structure when the information has been established in a quasi-permanent form as a cosine charge grating distribution in the photosensitive semiconductor. Under this circumstance of operation for the embodiments of FIGS. 1A and 1B, there are four characteristic time domain patterns shown in FIG. 3A, namely: time domain pattern 62 which represents the applied radiofrequency voltage which is applied to the transducer 44; the time domain pattern 64 for the radiofrequency pulse applied to the transparent electrode 28; the second radiofrequency pulse 66 applied to the transparent electrode 28 for readout of the stored information and the electrical signal pattern 68 representative of the information content of the optical image projected onto the photosensitive semiconductor 20. The read-out radiofrequency signal peaks 1C', 2C', 3C' and 4C' correspond to the optical intensity pattern 14 peaks 1A, 2A, 3A and 4A respectively of FIG. 1A. The various signals are shown as having time domain characteristics where $t$ = time
$L$ = length of optical image
$V_s$ = velocity of sound in substrate
$D_1$ = distance between left transducer and left edge of optical image
$D_2$ = distance from right edge of optical image to right transducer
$T$ = time for application of $E_3$.

Figure 3B:
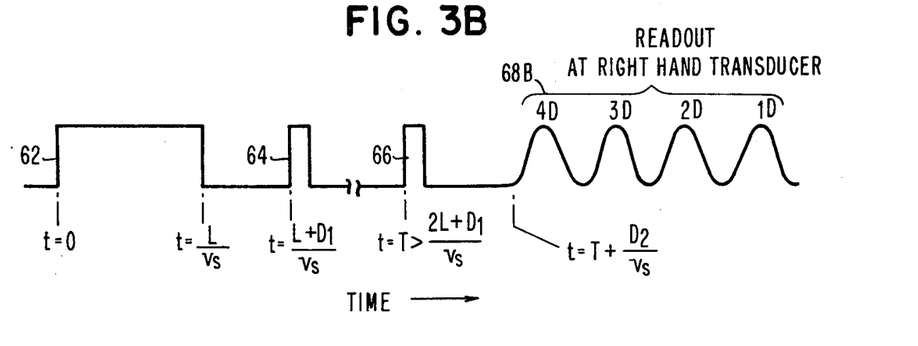

FIG. 3B presents the time domain diagram characteristics for read-out of the forward acoustic wave carrying stored information on the optical intensity pattern of FIG. 1A. FIG. 3B is identical to FIG. 3A except for the presence of read-out radiofrequency signal peaks 4D, 3D, 2D and 1D which correspond respectively to the optical intensity pattern peak 14 of FIG. 1A.

Figure 4A:
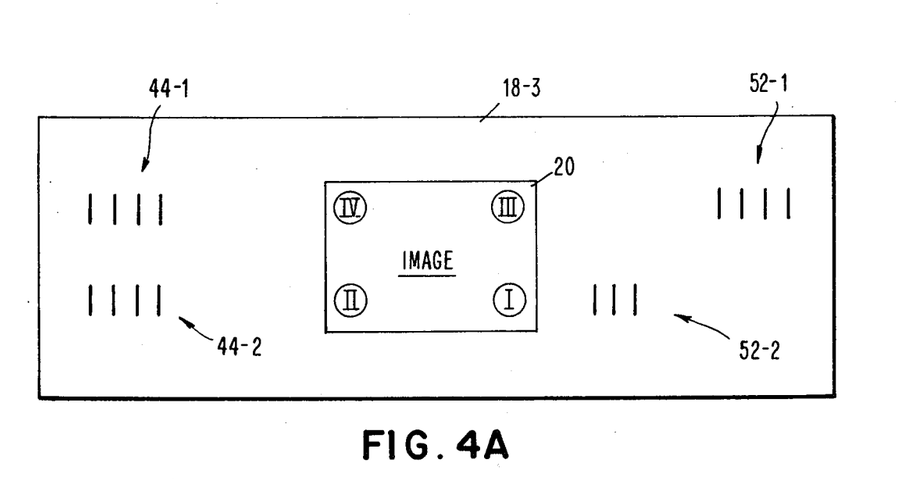
FIG. 4A is a schematic diagram illustrating another embodiment of this invention to show the manner of obtaining a transformation from parallel input acoustic waves to sequential electrical output waves for storage of information and read-out of the transducers on the right.
Figure 4B:
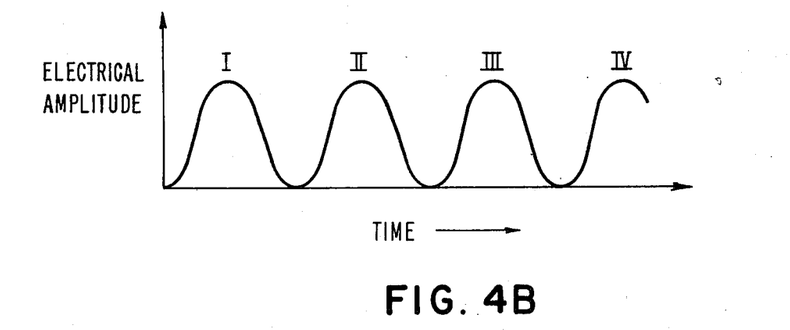
FIG. 4B is a time domain diagram showing the sequence of electrical signals from geometric points I, II, III and IV of the embodiment of FIG. 4A as obtained in the output signal electrical amplitude variations.

FIG. 4A illustrates another embodiment of this invention wherein a planar optical image can be projected onto the surface of the photosensitive semiconductor 20 and a sequential information readout of the scanned image can be obtained. In this embodiment there are a plurality of transducers, e.g., for two lines of information transducers 44-1 and 44-2 and output transducers 52-1 and 52-2. For clarification of presentation there are four exemplary data points shown in the FIG. 4A, i.e., I, II, III and IV. By staggering the locations of the output transducers 52-1 and 52-2, the output information is received on a single output communication channel as a serial representation of the parallel optical information presented to the surface of the photosensitive semiconductor. Thus, FIG. 4B shows optical intensity patterns IB, IIB, IIIB and IVB corresponding to the information presented optically to the photosensitive semiconductor surface 18-3 at respective geometric points I, II, III and Iv.

In the operation of this invention, both for the situation where the charge is stored in the photosensitive semiconductor so that readout may be had at some selected time subsequent to the projection of the optical image onto the photosensitive semiconductor surface 18 and for the situation where the time retention of the charge pattern is such that it must necessarily be considered to be present only during the presentation of the optical image, there are obtained in the piezoelectric substrate 34 a backward acoustic wave which bears the information instantaneously.

CONSIDERATIONS FOR THE INVENTION

Practice of this invention provides a simple, fast and high resolution technique for converting an optical image into radiofrequency information in a format suitable for data transmission on a communication channel. In one practice of the invention a light sensitive parametric interaction of a strain wave with a radiofrequency electric field is utilized for connecting information in an optical image into information in radiofrequency electrical signal format. In another practice of the invention the redistribution of trapped space charge in a piezoelectric crystal resultant from the non-linear interaction of a strain wave with a radiofrequency electric field is utilized for converting information in an optical image into information in radiofrequency electrical signal format.

USE OF PARAMETRIC INTERACTION EFFECT

In the practice of this invention use may be made of the "parametric" interaction effect. This enables the scanner to operate at room temperature with readily available materials. The following identified publications are of background interest in this regard: ("Parametric Electric Field Echoes in CdS", R. L. Melcher and N. S. Shiren, 1974 Ultrasonics Symposium Proceedings, IEEE Cat. No. 74 CHO 896-ISU; and "New Class of Polarization Echoes" R. L. Melcher and N. S. Shiren, Phys. Rev. Letters 34, 731(1975). Any light sensitive parametric backward wave interaction mechanism involving a forward acoustic wave at frequency $\omega$ and an electric field pump at frequency $\omega_2$ may be utilized in the practice of this invention according to the principles of the preferred embodiment thereof (FIG. 1A, 1B). In particular, other than $\omega_1 = \omega_2$ or $\omega_2 = 2\omega$, interactions may be used ($\omega_1$, $\omega_2$ refer to the carrier frequencies of acoustic and electric pulses respectively). In particular, read-out occurs when the frequencies $\omega_1$ and $\omega_2$ are related by $\omega_2 = \omega 1/n$, where $n$ is an integer other than zero and the backward wave read-out occurs at $\omega_1$.

An optical scanner according to the principles of this invention can be readily operated at room temperature with available materials by the parametric interaction of a forward propagating elastic wave with an radiofrequency electric field which generates a backward acoustic wave with no intermediate storage of charge. The magnitude of the backward wave parametric interaction is determined by the number density of filled impurity states (traps) in the crystal. The local number density at a given point in the crystal is determined by the light intensity thereat. Therefore, the backward wave amplitude is modulated by the light intensity of the optical image which is focused on the crystal. In operation the driving source 48 is periodically enabled, by means not illustrated, to energize the SAW transducer 44. After suitable delay, to allow the acoustic wave produced by SAW transducer 44, to register with the electrode system comprising electrodes 28 and 36, the electrode system is energized by radiofrequency source 32 thus producing the necessary high frequency electrical field across PSSC 20 and piezoelectric crystal 34. Therefore, a backward travelling acoustic wave is parametrically generated and subsequently converted at transducer 44 into an electrical signal.

USE OF STORAGE ECHO EFFECT

An optical scanner according to the principles of this invention may be based upon the "holographic" electric field echo effect which is the storage of a charge pattern in shallow impurity states within the bandgap of a semiconductor by the interference between a propagating acoustic wave and a uniform micro-wave electric field of the same frequency. This effect is described in copending U. S. Pat. Application Ser. No. 490,527 filed July 22, 1974 by R. Melcher et al, and in Phys. Rev. Letters 31, 819 (1973) by N. S. Shiren et al. The amplitude of the charge pattern is modulated by the light intensity of an image focused on the piezoelectric crystal. Because of the short lifetime of the stored charge grating at elevated temperatures, the operation of such a scanner at room temperature is not as practical as operation at room temperature through the parametric interaction.

Figure 1D:
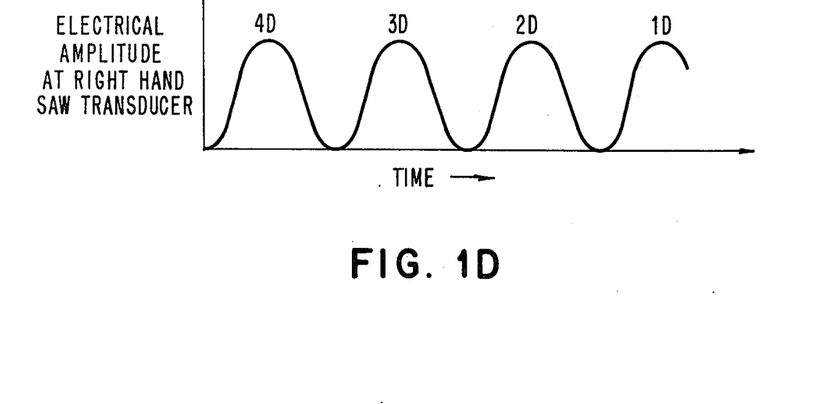
FIG. 1D is a signal diagram for read-out comparable to the signal diagram of FIG. 1C but in which the read-out is at the transducer on the right for read-out of stored information.

In particular, with reference to FIG. 1A a surface acoustic wave (SAW) is established on a piezoelectric substrate 34 which is over-laid with a photosensitive semiconductor (PSSC) 20 or is itself a photosensitive semiconductor as in FIG. 1B. The optical image on the PSSC 20 traps excitted charge carriers at impurity states in the PSSC in a spatial distribution corresponding to the intensity distribution 14 of the incident light image. During the passage of the SAW under the optical image a short radiofrequency electric field pulse is applied across the PSSC 20 and the piezoelectric substrate 34 simultaneously or shortly after the focusing of the image thereon. The space charge in the PSSC is redistributed into a cosine grating because of the non-linear interaction between the electric field pulse $\vec{E}_1$ which is applied to the SAW input transducer 44 and the radiofrequency field $\vec{E}_2$ applied to electrodes 28, 36. The cosine grating exists only in the areas of the PSSC 20 which are illuminated and is approximately proportional to the intensity of the incident light because it is only at the areas where the PSSC 20 is illuminated that there is electrical charge which can be redistributed by the interaction between the strain wave and the electric field. To read out the stored optical image pattern in the PSSC 20, another electric field pulse $E_3$ is applied to the electrodes 28 and 36 on the PSSC 20 and generates a backward SAW on the piezoelectric crystal which is converted at transducer 44 into a radiofrequency signal bearing the stored information. Simultaneously, a modulated forward SAW is generated and can be converted at transducer 52 to output radiofrequency signal. The electrical output at either transducer 44 or transducer 52 is an amplitude modulated signal when the output is readout as a backward wave (from transducer 44) the sequence of data (FIG. 1C) is reversed from the sequence of data (FIG. 1D) when the output is readout as a forward wave (from transducer 52).

An optical scanning device in accordance with the principles of this invention has analog readout because the amplitude modulation of the carrier is proportional to the optical intensity at any given point of the optical image.

By careful selection of the bandgap of the PSSC 20, it is possible to make the optical scanner device sensitive only to a narrow band of the optical spectrum. Consequently, it can be made color sensitive. By simultaneously focusing a given colored image on three separate optical scanning devices (not shown) which are respectively sensitive to red, green and blue, wavelength (color) information as well as intensity information can be converted to radiofrequency signals. By using the SAW delay line feature of this invention as illustrated in FIG. 4A, all the intensity and wavelength information which is contained in a two dimensional image can be read out as sequential radiofrequency signals on a single transmission line as shown in FIG. 4B.

The piezoelectric crystal may be $LiNbO_3$, $LiTaO_3$, ZnO, CdS, GaAs or other materials having like piezoelectric characteristics.

The illuminated area on the PSSC depends on the width of the object being illuminated as well on the length of the object being illuminated. The optical scanner of this invention is essentially a unidimensional device, i.e., the amplitude of the backward travelling wave at any point in time corresponds to a particular point along the major dimension of the scanner. This amplitude is the sum of the interactions produced across the width of the scanner at that point. Therefore, the optical signal is preferably substantially unidimensional.

What is claimed is:

1. Apparatus for converting an optical image into a related electrical signal comprising
    a photosensitive semiconductor body,
    a piezoelectric substrate adjacent to said semiconductor containing defect sites on which electrons can be trapped and such traps can be subsequently ionized by electric fields,
    means for applying radiofrequency electrical field to said semiconductor of frequency $\omega_2$,
    means for imaging the optical image on said semiconductor to fill electron traps therein corresponding to said optical pattern, whereby charge distributions appear in the semiconductor in accordance with information present in the optical image,
    means for propagating an input acoustic wave of frequency $\omega_1$ along said piezoelectric substrate in one direction to interact parametrically said electrical field and said acoustic wave to form a modulated backward propagating output acoustic wave of frequency $\omega_1$, said frequencies being related by $\omega_2 = \omega_1/n$, where $n$ is an integer other than zero and
    means for converting said modulated output acoustic wave into a related electrical signal.

2. Apparatus in accordance with claim 1 wherein said means for applying said electrical field to said semiconductor comprises:
    a radiofrequency electric field generator coupled across said semiconductor and said piezoelectric substrate.

3. A device for obtaining information in electrical form from an optical image comprising:
    a photosensitive piezoelectric material containing defect sites on which electrons can be trapped and such traps can be subsequently ionized by electric fields,
    means for applying an optical pattern of charging light to said material to fill electron traps therein corresponding to said optical pattern,
    means for propagating a radiofrequency acoustic wave of frequency $\omega_1$ through said piezoelectric material, and
    means for applying a radiofrequency electrical field pulse of frequency $\omega_2$ to said piezoelectric material during the presence of said acoustic wave to interact parametrically said acoustic wave and said radiofrequency pulse to obtain a backward acousic wave of frequency $\omega_1$ which bears the information of said optical pattern, said frequencies being related by $\omega_2 = \omega_1/n$, where $n$ is an integer other than zero, and
    means for converting said backward acoustic wave to an electrical signal.

4. The device of claim 3 wherein said piezoelectric material is CdS.

5. The device of claim 3 wherein said CdS is sulfur doped and has a resistivity $\leqq$ 100,000 ohm-cm.

6. A device as set forth in claim 5 wherein said photosensitive piezoelectric crystal is fully anion-compensated.

7. An optical signal scanner for converting an optical pattern to a related electrical signal comprising:
    a photoconducting layer;
    a piezoelectric body containing defect sites on which electrons can be trapped and such traps can be subsequently ionized by electric fields proximate to said photoconducting layer;
    a pair of electrodes disposed to encompass between them respective portions of said photoconducting layer and said piezoelectric body;
    means for focusing an optical pattern on said photoconducting layer which locally varies the charge distributions of said photoconducting layer;
    transducer means for applying a forward acoustic wave of a frequency $\omega_1$ to said piezoelectric body;
    means for applying an alternating electrical voltage of frequency $\omega_2$ to said electrodes to establish an alternating electric field in both said photoconducting layer and said piezoelectric body to modulate parametric interaction between said electric field and said acoustic wave by said charge distribution in said photoconducting layer to produce a backward acoustic wave in said piezoelectric body which bears said modulation, said frequencies being related by $\omega_2 = \omega_1/n$, where $n$ is an integer other than zero.

8. The apparatus of claim 7 wherein said forward acoustic wave is of duration corresponding to the spatial extent of said optical signal and said electric field is applied by said electrodes at a time when said forward acoustic wave registers with the extent of said signal on said photoconducting layer.

9. The apparatus of claim 7 wherein each of said pair of electrodes lies in a different plane, parallel to each other, each having a dimension at least co-extensive with the extent of said optical signal focused on said photoconducting layer, one of said electrodes being a transparent electrode.

10. The apparatus of claim 9 wherein said piezoelectric crystal is disposed between said pair of electrodes.

11. In an apparatus for scanning an optical pattern, a fully anion-compensated photosensitive piezoelectric substrate containing defects on which electrons can be trapped and such traps can be subsequently ionized by electric fields,
    means for applying an optical pattern of charging light to said piezoelectric substrate to fill electron traps therein corresponding to said optical pattern,
    an acoustic wave input transducer means attached to said piezoelectric substrate for generating an input acoustic wave of frequency $\omega_1$ in one direction past said film,
    means for applying a radiofrequency electric field of frequency $\omega_2$, where $\omega_1 = \omega_2$, in said film where said charge distributions and said acoustic wave are adjacent to interact non-linearly said acoustic wave and said radiofrequency electric field to produce stored charge distributions in said film representative of said optical pattern.

12. In an apparatus for scanning an optical intensity pattern, a photosensitive semiconductor film, a fully anion-compensated piezoelectric substrate adjacent to but spaced from the semiconductor film, and containing defect sites on which electrons can be trapped and such traps can be subsequently ionized by electric fields, means for applying an optical pattern of charging light to said material to fill electron traps therein corresponding to said optical pattern, an acoustic wave input transducer means attached to said piezoelectric substrate adjacent the first end of the semiconductor film for generating an input of acoustic wave of a frequency $\omega_1$ in one direction past the semiconductor film, and means for applying a radiofrequency electric field of a frequency $\omega_2$, where $\omega_1 = \omega_2$, across said charge distributions in said semiconductor film and said acoustic wave in said piezoelectric substrate where said charge distributions and acoustic wave are adjacent to interact non-linearly said acoustic wave and said radiofrequency electric field to produce stored charge distributions on said film representative of said optical intensity pattern.

* * * * *